United States Patent
Beers et al.

(10) Patent No.: US 8,240,351 B2
(45) Date of Patent: Aug. 14, 2012

(54) PNEUMATIC TIRE HAVING AIR RETENTION INNERLINER CONTAINING ANCHORED GLASS MICROSPHERES

(75) Inventors: Roger Neil Beers, Uniontown, OH (US); Aaron Scott Puhala, Kent, OH (US); David John Zanzig, Uniontown, OH (US); Paul Harry Sandstrom, Cuyahoga Falls, OH (US); Ping Zhang, Hudson, OH (US); George Frank Balogh, North Canton, OH (US); Joseph Kevin Hubbell, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 632 days.

(21) Appl. No.: 12/368,618

(22) Filed: Feb. 10, 2009

(65) Prior Publication Data

US 2010/0200139 A1    Aug. 12, 2010

(51) Int. Cl.
*B60C 5/14* (2006.01)
(52) U.S. Cl. .................. 152/511; 152/450; 152/510
(58) Field of Classification Search .............. 152/450, 152/510, 511, 512, 209.4
See application file for complete search history.

(56) References Cited

U.S. PATENT DOCUMENTS

| | | | | |
|---|---|---|---|---|
| 4,502,520 A | * | 3/1985 | Sandstrom | 152/510 |
| 4,928,741 A | * | 5/1990 | Rye et al. | 152/504 |
| 5,967,211 A | | 10/1999 | Lucas et al. | 152/209.4 |
| 6,448,325 B2 | * | 9/2002 | Visel et al. | 524/492 |
| 6,851,462 B2 | * | 2/2005 | Frank et al. | 152/450 |
| 6,852,794 B2 | * | 2/2005 | Puhala et al. | 524/588 |
| 6,889,735 B2 | * | 5/2005 | Frank et al. | 152/450 |
| 7,406,990 B2 | | 8/2008 | Brown et al. | 152/516 |
| 7,674,344 B2 | * | 3/2010 | D'Sidocky et al. | 156/110.1 |
| 2001/0056151 A1 | * | 12/2001 | Visel et al. | 524/493 |
| 2003/0050408 A1 | * | 3/2003 | Puhala et al. | 525/479 |
| 2004/0092648 A1 | * | 5/2004 | Jones et al. | 524/502 |
| 2004/0242795 A1 | * | 12/2004 | Waddell et al. | 525/331.9 |
| 2005/0113502 A1 | * | 5/2005 | Fitzharris Wall et al. | 524/425 |
| 2005/0137314 A1 | * | 6/2005 | Spadone | 524/492 |
| 2005/0205184 A1 | * | 9/2005 | Fitzharris Wall | 152/502 |
| 2005/0205186 A1 | * | 9/2005 | Wall et al. | 152/504 |
| 2005/0215684 A1 | * | 9/2005 | Fitzharris Wall | 524/425 |
| 2006/0254687 A1 | * | 11/2006 | Sandstrom | 152/504 |
| 2007/0034311 A1 | * | 2/2007 | Brown et al. | 152/517 |
| 2007/0044883 A1 | * | 3/2007 | D'Sidocky et al. | 152/503 |
| 2007/0179251 A1 | * | 8/2007 | Waddell et al. | 525/332.3 |

FOREIGN PATENT DOCUMENTS

| | | |
|---|---|---|
| EP | 905186 A1 | 3/1999 |
| EP | 1329479 A1 | 7/2003 |
| EP | 1447424 A1 | 8/2004 |
| WO | 2008/118174 A1 | 10/2008 |

* cited by examiner

*Primary Examiner* — Joseph Del Sole
*Assistant Examiner* — Seyed Masoud Malekzadeh
(74) *Attorney, Agent, or Firm* — Henry C. Young, Jr.

(57) ABSTRACT

A pneumatic rubber tire having an integral rubber innerliner containing anchored hollow glass microspheres.

10 Claims, No Drawings

PNEUMATIC TIRE HAVING AIR RETENTION INNERLINER CONTAINING ANCHORED GLASS MICROSPHERES

FIELD OF THE INVENTION

A pneumatic rubber tire having an integral rubber innerliner containing anchored hollow glass microspheres.

BACKGROUND OF THE INVENTION

Maintaining proper air pressure in a pneumatic tire is very important to enable the tire to properly perform desired functions.

To maintain air pressure inside of a pneumatic tire, its inner surface is typically comprised of a relatively thin rubber layer intended to prevent or retard the permeation of air into the tire carcass from the tire's inner air chamber. It is often referred to as an innerliner. Innerliners have been used for many years in tubeless pneumatic vehicle tires to retard or prevent the escape of air used to inflate the tire, thereby maintaining tire pressure. Rubbers which are relatively impermeable to air are often used as a major portion of said innerliners and can include butyl rubber and halobutyl rubbers such as, for example, chlorobutyl rubber and bromobutyl rubber.

However, such elastomers are typically the most expensive rubbers used in the tire.

While alternative, less expensive, elastomers may be used for the innerliner, such as for example styrene/butadiene rubber (SBR), natural rubber (NR) and cis 1,4-butadiene rubber (BR), a significantly thicker gauge of the alternate elastomers would be required for a similar air retention effect, leading to an increased tire weight.

To reduce both the weight and cost of the tire innerliner, it is proposed to utilize an inclusion of hollow glass microspheres in the tire innerliner rubber composition which have a significantly lower specific gravity than butyl rubber and halobutyl rubbers.

However, it is considered herein that a simple inclusion of a dispersion of hollow glass microspheres in the tire innerliner would not be sufficient to meet desirable performance standards when the tire, hence the tire inner liner, is cyclically deformed during tire running conditions. Such flexural deformation of the tire innerliner is likely to promote separation of the hollow glass microspheres from the elastomer matrix, hence, creating a passage for air to go through the inner liner rubber layer and to thereby reduce its air impermeability.

Without adequate bonding of the microspheres to the halobutyl rubber matrix and/or reinforcing filler system, they would form voids following high strain application wherein the voids would both create a path for air permeation but also a fracture area to create cut growth and potential tire innerliner cracking.

Accordingly, it is desired to prepare a more stable matrix for the inner liner rubber composition.

For this invention it is envisioned that a butyl rubber (e.g. halobutyl rubber) matrix, particularly a tire innerliner butyl rubber matrix, be provided which contains a dispersion of the hollow glass microspheres which are anchored within the innerliner butyl rubber based composition to the butyl rubber itself to inhibit, or restrict, their mobility within the butyl rubber composition, when cured, to promote a more effective air permeation resistant barrier layer for the tire during service of the tire under operating conditions. Such innovation is considered herein to be in a form of a new butyl rubber matrix, or in a sense a network, in a form of a tire inner liner layer which is a significant departure from, and readily distinct from, a tire inner liner containing a simple inclusion of a dispersion of hollow glass microspheres.

In practice, a tire rubber inner liner may, for example, be prepared by conventional calendering or milling techniques to form a strip of uncured compounded rubber of an appropriate width. Typically the innerliner rubber strip is the first element of the tire to be applied to a tire building drum, over and around which the remainder of the tire is built. When the tire is cured, such inner liner becomes an integral, co-cured, part of the tire. Tire innerliners and methods of preparation are well known to those having skill in such art.

In the description of this invention, the terms "rubber" and "elastomer", where used, are used interchangeably unless otherwise indicated. The terms "cure" and "vulcanize", where used, are used interchangeably unless otherwise indicated. The terms "compound"and "rubber composition", where used, are used interchangeably unless otherwise indicated.

The term "phr" refers to parts by weight of a particular material per 100 parts by weight rubber.

DISCLOSURE AND PRACTICE OF INVENTION

In accordance with this invention, a pneumatic rubber tire is provided having an integral innerliner of a sulfur cured rubber composition comprised of, based on parts by weight per 100 parts by weight rubber (phr), a blend of (A) rubber comprised of:
  (1) at least one of butyl rubber and halobutyl rubber, wherein said halobutyl rubber is comprised of (selected from) at least one of chlorobutyl rubber and bromobutyl rubber, preferably bromobutyl rubber, and
  (2) optionally, up to about 25 phr of epoxidized natural cis 1,4-polyisoprene rubber, (B) about 20 to about 60, alternately about 25 to about 55, phr of rubber reinforcing filler comprised of:
  (1) rubber reinforcing carbon black,
  (2) combination of rubber reinforcing black and synthetic amorphous silica (e.g. precipitated silica) or,
  (3) combination of coal dust and at least one of rubber reinforcing carbon black and precipitated silica, (C) about 0.5 to about 30, alternately about 1 to about 25, phr of hollow glass microspheres, and (D) an anchoring agent for said hollow glass microspheres having a moiety reactive with hydroxyl groups contained on said glass microspheres, and said precipitated silica if used, and another different moiety interactive with butyl and halobutyl rubber, wherein said anchoring agent is optionally used in the presence of said epoxidized natural rubber. (Where the epoxidixed natural rubber is used in the rubber composition, use of the anchoring agent is optional. Thus, rubber composition may, if desired, contain the epoxidized natural rubber in the absence of, or without, the said anchoring agent.)

In practice, the moiety of said anchoring agent which is reactive with hydroxyl groups contained on said glass microspheres, and said precipitated silica if used, is composed of alkoxy groups and particularly siloxy groups. The moiety of said anchoring agent interactive with said rubber is a sulfur based moiety which is interactive with carbon-to-carbon bonds of said rubber.

In practice, the epoxy moiety on the epoxidized natural rubber, if used, may also be a contributing anchoring agent for the said hollow glass microspheres, particularly insofar as anchoring to the natural rubber is concerned.

In practice, the hollow glass microspheres desirably have a crush strength of about 5,000 to about 6,000 psi (about 34.5 to about 41.4 MPa) in order to inhibit or retard any significant fragmentation of the hollow glass microspheres during high shear mixing of the rubber composition which contains a dispersion thereof. They may typically have an average diameter in a range of from about 10 to about 50 microns.

Representative of hollow glass microspheres are those, for example, such as hollow glass microspheres as Scotchlite™ S38HS, K-46, S60, S60HS and iM30K from the 3M Company, as Spherical™ 60P18 and 110P8. Silane modified (pretreated) hollow glass microspheres as H50/10,000EPX™ from the 3M Company may also be used.

Butyl rubber and halobutyl rubbers such as chlorobutyl rubber and bromobutyl rubber are well known to those having skill in such art for use in pneumatic tire innerliners for their air retention properties because of their relatively low air impermeability property.

Butyl rubber is typically a copolymer of isobutylene and a minor amount of a diene monomer such as, for example, isoprene where the isoprene content of the rubber may range, for example, from about 2 to about 6 percent. Such butyl rubber is well known to those having skill in the pertinent art.

The halobutyl rubber is a halogenated butyl rubber with a halogen such as for example chlorine and bromine. The resulting chlorobutyl rubber and bromobutyl rubber are well known to those having skill in such art.

Representative of anchoring agents are, for example, comprised of alkoxypolysulfides and alkoxyorganomercaptosilanes.

Representative of such alkoxypolysulfide based anchoring agents for said hollow glass microspheres are, for example, bis(3-trialkoxysilylalkyl)polysulfides which contain an average of from about 2 to about 4, alternately from about 2 to about 2.6, or from about 3.4 to about 3.8, connecting sulfur atoms in its polysulfidic bridge. Representative of examples of said bis(3-trialkoxysilylalkyl)polysulfide are comprised of bis(3-triethoxysilylpropyl) polysulfides.

While such anchoring agents have also been proposed for use as coupling agents for amorphous synthetic silica (e.g. precipitated silica), they are preferably referred to herein as anchoring agents because the tire inner liner is intended to not be a silica rich rubber composition and, therefore, the anchoring effect is with the hollow glass microspheres and not with more irregularly shaped silica particles to provide a glass sphere stabilizing effect within the innerliner rubber composition.

Representative of said epoxidized natural rubber are epoxidized natural rubber elastomers having an epoxy (e.g. epoxide) content in a range, for example, from about 10 to about 50 percent thereof. In addition to an anchoring effect for the hollow glass microspheres (to anchor the microspheres to the natural rubber), the epoxidized natural rubber also provides an additional benefit of promoting further resistance to air permeability of the butyl rubber (including halobutyl rubber) based rubber composition.

As previously mentioned, in practice, the innerliner composition is first prepared as an uncured compounded rubber strip, constructed as an inner surface (exposed inside surface) for an uncured rubber tire structure, (carcass), and sulfur co-cured with the tire carcass during the tire curing operation under conditions of heat and pressure. Thus, the innerliner becomes an integral part of the tire by being co-cured therewith as compared to being a simple adherent laminate.

It is to be understood that the prescribed innerliner rubbers can be compounded with conventional rubber compounding ingredients comprised of, for example, carbon black, zinc oxide, stearic acid, rubber processing oil, sulfur, sulfur vulcanization accelerator(s) and antidegradant(s) and then typically extruded and/or calendered to form the uncured gum strip. Such rubber compounding materials and methods are well known to those having skill in such art.

Historically, low density glass microspheres and hollow ceramic particles have been suggested for applications in tires such as, for example, in U.S. Pat. Nos. 5,967,211 and 7,406,990, U.S. Patent Application No. 2004/0188035 and EP patent publication Nos. 0905186, 1329479 and 1447424. However, it is not seen that such suggestions teach, suggest or provide motivation for utilization of dispersions of anchored hollow glass microspheres in the cured butyl rubber (including halobutyl rubber) for enhancing resistance to air permeability in tire inner liners including a corresponding reduction in tire weight.

An important feature of this invention for use of the dispersion of the anchored hollow glass microspheres in the butyl rubber (including halobutyl rubber) based tire innerliner layer is the ability to reduce the specific gravity of the tire inner liner and thereby promoting a reduction in tire weight as well as providing a tire inner liner layer which promotes resistance to air transmission through the innerliner of which both aspects promote its suitability as an air barrier for a tire.

It is readily envisioned that a thinner tire innerliner might therefore be used for the tire to provide resistance to air transmission (resistance to air permeability) which can further advantageously reduce the tire weight and promote an increase in fuel economy for an associated vehicle.

The uncured tire carcass rubber interface with which the innerliner is sulfur co-cured can be of various sulfur curable rubber blends such as, for example, cis 1,4-polybutadiene, cis 1,4-polyisoprene and styrene/butadiene copolymer rubbers.

Typically the innerliner has an uncured rubber thickness in the range of about 0.03 to about 0.08 inch (0.08-0.2 cm), depending somewhat on the tire size, its intended use and degree of air retention desired.

The pneumatic tire with the integral innerliner composition may be constructed in the form of a passenger tire, truck tire, or other type of bias or radial pneumatic tire.

The following examples are presented to demonstrate the invention. The parts and percentages are by weight unless otherwise noted.

EXAMPLE I

Comparative Example

Samples of rubber compositions comprised of bromobutyl rubber and butyl rubber were prepared which alternately contained a dispersion of hollow glass microspheres without an anchoring agent for the glass microspheres as illustrated in Table 1.

The Samples are identified herein as rubber "comparative" rubber Samples A through D.

Rubber Sample A is a Control rubber Sample without an inclusion of hollow glass microspheres.

The Samples were prepared by mixing the ingredients in an internal rubber mixer in a sequential series of non-productive (without sulfur and accelerators) mixing steps and followed by a final productive mixing step with sulfur and accelerator addition at a lower mix temperature. The rubber compositions were dumped from the rubber mixer after each mixing step, sheeted out from an open mill and allowed to cool to below 40° C. after each mixing step. The non-productive mixing steps were mixed for about 4 minutes to a temperature of about 150° C. The subsequent productive mixing step was conducted for about 2 minutes to a temperature of about 110° C.

The basic formulation is shown in Table 1.

The rubber compositions were cured for about 23 minutes at about 170° C. Various physical properties are reported in the following Table 2.

TABLE 1

| Non-Productive Mixing Step (to 150° C.) | |
| --- | --- |
| Butyl rubber[1] | 10 |
| Bromobutyl rubber[2] | 90 |
| Carbon black[3] | 40-55 |
| Microspheres[4] | 0-15 |
| Rubber processing oil[5] | 3.8 |
| Fatty acid[6] | 0.5 |
| Phenol formaldehyde | 2.5 |
| Productive Mixing Step (to 110° C.) | |
| Accelerator(s)[7] | 1.4 |
| Sulfur | 0.5 |
| Zinc oxide | 1 |

[1]Butyl rubber as Butyl 268 ™ from the ExxonMobil Company
[2]Bromobutyl rubber as Bromobutyl 2222 ™ from the ExxonMobil Company as a brominated butyl rubber (brominated elastomeric copolymer of isobutylene and isoprene
[3]Carbon black as N660, an ASTM designation
[4]Hollow glass microspheres as S38HS ™ from the 3 M Company having an average diameter of about 40 microns and a crush strength of about 5,500 psi (37.9 MPa) and a true density of about 0.38 g/cc.
[5]Naphthenic/paraffinic medium process oil
[6]Mixture comprised of stearic, oleic and linoleic acids
[7]Benzothiazyl disulfide and tetramethylthiuram disulfide sulfur cure accelerators

TABLE 2

| | | Comparative Samples | | |
| --- | --- | --- | --- | --- |
| | Control A | B | C | D |
| Microspheres (phr) | 0 | 5 | 10 | 15 |
| Carbon black (phr) | 55 | 40 | 40 | 40 |
| MDR[1], 170° C. for 30 minutes | | | | |
| T90 (minutes) | 7.1 | 6.8 | 6.8 | 6.7 |
| Maximum torque, dNm | 6.0 | 5.6 | 6.1 | 6.6 |
| Minimum torque, dNm | 2.3 | 1.4 | 1.5 | 1.5 |
| Stress-Strain Properties | | | | |
| 100% ring modulus, MPa | 0.93 | 0.78 | 0.81 | 0.84 |
| 300% ring modulus, MPa | 3.99 | 2.08 | 1.94 | 1.93 |
| Elongation at break (%) | 681 | 877 | 672 | 651 |
| Shore A Hardness | | | | |
| 23° C. | 53 | 52 | 53 | 55 |
| 100° C. | 39 | 36 | 37 | 39 |
| Rebound | | | | |
| 23° C., (%) | 11.4 | 11.0 | 10.5 | 10.4 |
| 100° C. (%) | 47.7 | 46.1 | 44.3 | 42.8 |
| Rubber Composition Density (g/cc) | | | | |
| Measured | 1.14 | 1.07 | 1.05 | 1.04 |
| Calculated | 1.13 | 1.03 | 0.98 | 0.94 |
| Brittle Point[2], ° C. | −31.3 | −32.5 | −29.5 | −30.1 |
| Relative air permeability at 23° C.[3] | 100 | 94 | 63 | 54 |

[1]Data according to Rubber Process Analyzer as RPA 2000 ™, an instrument by Alpha Technologies.
[2]ASTM D-746
[3]ASTM D-143

From Table 2 it can be seen that the processing aspect of the rubber Sample D, as compared to Control rubber Sample A is improved by the inclusion of the dispersion of the hollow glass microspheres in rubber Sample D as shown by the lower minimum Torque during the cure of the rubber Samples (MDR measurements).

From Table 2 it can further be seen that the inclusion of the glass microspheres in the rubber Samples resulted in a significant enhancement of the resistance to air permeability, as compared to Control rubber Sample A without the glass microspheres, especially for more highly loaded rubber Samples C and D which were only 63 and 54 percent, respectively of the air permeability of Control rubber Sample A.

This is considered herein to be significant in a sense of promoting an enhanced age resistance of tire carcass components such as, for example, carcass ply rubber coats and the carcass itself by promoting a reduction in air transmission through the tire innerliner layer for tire innerliners of a similar or same thickness, or gauge. It can also be seen that a reduction in the weight of the tire can be obtained because of the lower density of the innerliner rubber composition for innerliners of the same thickness. Uniquely, it can further be seen that a reduction in the thickness of the innerliner might be used and still obtain a satisfactory resistance to air transmission to effect a further reduction in tire weight to further increase fuel economy for an associated vehicle.

From Table 2 it can additionally be seen that the difference between the measured densities of respective rubber Samples and the calculated densities of respective rubber Samples was very small.

This is considered significant in a sense that a significant majority of the glass microspheres survived the high shear rubber mixing in an internal rubber mixer as well as associated milling and curing operations even though the crush strength of the hollow glass microspheres was only moderate, namely about 5,500 psi (37.9 MPa).

It can, however, be seen from Table 2 that the inclusion of the dispersion of the glass microspheres resulted in rubber Samples with much reduced mechanical performance as evidenced by significantly lower 100 percent and 300 percent modulii and lower 23° C. and 100° C. rebound values as compared to such values for Control rubber Sample A. This is indicative of relatively low interaction between the rubber and glass microspheres.

This is considered herein to be significant in a sense that lower rubber/microsphere interaction can lead to detachment of the glass microspheres from the cured rubber matrix under dynamic deformation, including extensive flexing, to result in lower resistance to air permeation (lower air impermeability). Without adequate bonding of the microspheres to the cured halobutyl rubber matrix they would form voids following high strain application wherein the voids would both create a path for air permeation but also a fracture area to create cut growth and potential tire innerliner cracking.

EXAMPLE II

Use of an anchoring agent for a dispersion of hollow glass microspheres in a butyl rubber, namely comprised of a combination of butyl rubber and bromobutyl rubber, based rubber composition was evaluated.

For this Example, rubber Sample E which contained the hollow glass microspheres plus an anchoring agent was prepared and compared with Control rubber Sample A of Example I without an inclusion of hollow glass microspheres and rubber Sample D of Example I which contained the dispersion of hollow glass microspheres.

The rubber Sample E was prepared in the manner of the Samples of Example I.

The anchoring agent used for the hollow glass microspheres in rubber Sample E was comprised of bis(3-triethoxysilylpropyl)polysulfide as Si266™ from the Evonik Degussa company.

The rubber Sample ingredients are shown in Table 1 of Example I except that for rubber Sample E, 0.3 phr of the anchoring agent is added.

The rubber Samples were cured for about 23 minutes at about 170° C. Various physical properties are shown in the following Table 3 with the results for rubber Samples A and D taken from Table 2 of Example I.

TABLE 3

|  | Control | | |
| --- | --- | --- | --- |
|  | A | D | E |
| Microspheres (phr) | 0 | 15 | 15 |
| Anchoring agent (phr) | 0 | 0 | 0.3 |
| Carbon black (phr) | 55 | 40 | 40 |
| MDR[1], 170° C. for 30 minutes | | | |
| T90 (minutes) | 7.1 | 6.7 | 11.1 |
| Maximum torque, dNm | 6.0 | 6.6 | 6.3 |
| Minimum torque, dNm | 2.3 | 1.5 | 2.5 |
| Stress-Strain Properties | | | |
| 100% ring modulus, MPa | 0.93 | 0.84 | 1.03 |
| 300% ring modulus, MPa | 3.99 | 1.93 | 3.24 |
| Elongation at break (%) | 681 | 651 | 568 |
| Shore A Hardness | | | |
| 23° C. | 53 | 55 | 53 |
| 100° C. | 39 | 39 | 40 |
| Rebound | | | |
| 23° C., (%) | 11.4 | 10.4 | 11.7 |
| 100° C. (%) | 47.7 | 42.8 | 48.6 |

From Table 3 it can be seen that the introduction of the anchoring agent into the hollow glass microsphere dispersion-containing butyl rubber composition led to a significantly improved physical properties as seen by the significantly higher 100 percent and 300 percent modulii and rebound values at both 23° C. and 100° C. for rubber Sample E as compared to rubber Sample D without the anchoring agent and, further, as compared to Control rubber Sample A. This is indicative of significantly improved glass microsphere/rubber interaction and an anchoring effect for the glass microspheres (anchoring the glass microspheres to the butyl rubber).

This is considered herein to be significant in a sense that a good glass microsphere filler interaction was obtained with the butyl rubber to therefore stabilize the glass microsphere dispersion within the butyl rubber based rubber composition. This is considered herein to lead to significant reduction of an opportunity for the glass microspheres to detach from the polymer under dynamic deformation expected to occur for a tire inner liner during service of the tire. It is considered that this would promote long term air impermeability performance of the rubber composition. Without adequate bonding of the microspheres to the cured halobutyl rubber matrix, they would form voids following high strain application wherein the voids would both create a path for air permeation but also a fracture area to create cut growth and potential tire innerliner cracking.

EXAMPLE III

Samples of rubber compositions comprised of bromobutyl rubber and butyl rubber were prepared which alternately contained a dispersion of hollow glass microspheres with an anchoring agent for the glass microspheres as illustrated in Table 4. A higher crush strength of 6000 psi (41.4 MPa) for the glass microspheres was used as K46™ from the 3M company having an average diameter of about 40 microns and a true density of about 0.46 g/cc.

The Samples are identified herein as rubber "comparative" rubber Sample A and as Experimental rubber Samples F and G.

Rubber Sample A is a Control rubber Sample without an inclusion of hollow glass microspheres taken from Example I The anchoring agent used for the hollow glass microspheres in rubber Samples F and G was comprised of bis(3-triethoxysilylpropyl)polysulfide as Si266™ on a carbon black carrier in a 50/50 weight ratio thereof from the Evonik Degussa Company.

The rubber Samples were prepared in the manner of Example I.

The basic formulation is shown in Table 4.

TABLE 4

| Non-Productive Mixing Step (to 150° C.) | |
| --- | --- |
| Butyl rubber[1] | 10 |
| Bromobutyl rubber[2] | 90 |
| Carbon black[3] | 45-55 |
| Anchoring agent | 0-0.4 |
| Microspheres[4] | 0-10 |
| Rubber processing oil | 3.8 |
| Fatty acid[6] | 0.5 |
| Phenol formaldehyde | 2.5 |
| Productive Mixing Step (to 110° C.) | |
| Accelerator(s)[7] | 1.4 |
| Sulfur | 0.5 |
| Zinc oxide | 1 |

The ingredients were those identified for Table 1 of Example I except for the aforesaid glass microspheres and anchoring agent. Various physical properties of the rubber Samples are shown in the following Table 5.

TABLE 5

|  |  | Experimental Samples | |
| --- | --- | --- | --- |
|  | Control A | F | G |
| Glass microspheres (phr) | 0 | 5 | 10 |
| Anchoring agent (phr) | 0 | 0.2 | 0.4 |
| Carbon black (phr) | 55 | 50 | 45 |
| MDR, 170° C. for 30 minutes | | | |
| T90 (minutes) | 7.1 | 9 | 10.3 |
| Maximum torque, dNm | 6 | 5.6 | 6.1 |
| Minimum torque, dNm | 2.3 | 2.2 | 2.6 |
| Stress-Strain Properties | | | |
| 100% ring modulus, MPa | 0.93 | 0.98 | 1.08 |
| 300% ring modulus, MPa | 3.99 | 3.44 | 3.7 |
| Elongation at break (%) | 681 | 689 | 581 |
| Shore A Hardness | | | |
| 23° C. | 53 | 53 | 54 |
| 100° C. | 39 | 39 | 40 |
| Rebound | | | |
| 23° C., (%) | 11.4 | 11.6 | 11.8 |
| 100° C. (%) | 47.7 | 48.0 | 49.5 |
| Rubber Composition Density (g/cc) | | | |
| Measured | 1.14 | 1.10 | 1.08 |
| Calculated | 1.13 | 1.07 | 1.02 |
| Brittle point, ° C.[2] | −31.3 | −27.7 | −28.9 |
| Relative air permeability[3] at 23° C.[3] | 100 | 95 | 77 |

From Table 5 it can be seen that the combination of the anchoring agent and hollow glass microspheres led to the butyl rubber composition with significantly improved physical properties as seen by the significantly higher 100 percent and 300 percent modulii and rebound values at both 23° C. and 100° C. for Experimental rubber Samples F and G as compared to Control rubber Sample A. This is indicative of significantly improved glass microsphere/rubber interaction and an anchoring effect for the glass microspheres (anchoring the glass microspheres to the butyl rubber).

From Table 5 it can further be seen that the inclusion of the glass microspheres in the rubber Samples resulted in a significant enhancement of the resistance to air permeability, as compared to Control rubber Sample A without the glass microspheres, especially for more highly loaded rubber Sample G which reported only 77 percent of the air permeability of Control rubber Sample A.

This is considered herein to be significant in a sense of promoting an enhanced age resistance of tire carcass components such as, for example, carcass ply rubber coats and the carcass itself by promoting a reduction in air transmission through the tire innerliner layer for tire innerliners of a similar or same thickness, or gauge. It can also be seen that a reduction in the weight of the tire can be obtained because of the lower density of the innerliner rubber composition for innerliners of the same thickness, or gauge. Uniquely, it can further be seen that a reduction in the thickness of the innerliner might be used and still obtain a satisfactory resistance to air transmission to effect a further reduction in tire weight to further increase fuel economy for an associated vehicle.

From Table 5 it can additionally be seen that the difference between the measured densities of respective rubber Samples and the calculated densities of respective rubber Samples was very small.

This is considered significant in a sense that a significant majority of the glass microspheres survived the high shear rubber mixing in an internal rubber mixer as well as associated milling and curing operations even though the crush strength of the hollow glass microspheres was only moderate, namely about 6,000 psi (41.4 MPa).

EXAMPLE IV

Use of epoxidized natural rubber was evaluated for assistance in anchoring the hollow glass microspheres in the rubber composition and referred to herein as rubber Samples H through N.

The basic formulation is illustrated in Table 6.

The anchoring agent used for the hollow glass microspheres was comprised of bis(3-triethoxysilylpropyl) polysulfide as Si266™ on a carbon black carrier in a 50/50 weight ratio thereof from the Evonik Degussa company.

The rubber Samples were prepared in the manner of Example I.

Rubber compositions of Table 6 were cured for about 23 minutes at a temperature of about 170° C. Various physical properties are shown in the following Table 7.

TABLE 6

| Non-Productive Mixing Step (to 150° C.) | |
| --- | --- |
| Butyl rubber | 10 |
| Bromobutyl rubber | 65-90 |
| Epoxidized natural rubber[10] | 0-25 |
| Carbon black | 40-55 |
| Hollow glass microspheres | 0-15 |
| Rubber processing oil | 3.8 |
| Fatty acid | 0.5 |
| Phenol formaldehyde | 2.5 |
| Anchoring agent | 0 to 0.9 |
| Productive Mixing Step (to 110° C.) | |
| Accelerator(s)[8] | 1.4 |
| Sulfur | 0.5 |
| Zinc oxide | 1 |

[10]Expoxidized cis 1,4-polyisoprene rubber (ENR) as ENR50 ™ from the Malaysian Rubber Board having an expoxidation level of about 50 percent The hollow glass microspheres were K46™ from the 3M Company having an average diameter of about 40 microns, a crush strength of about 6,000 psi (41.4 MPa) and a true density of about 0.46 g/cc.

TABLE 7

| | H | I | J | K | L | M | N |
| --- | --- | --- | --- | --- | --- | --- | --- |
| Butyl rubber (phr) | 10 | 10 | 10 | 10 | 10 | 10 | 10 |
| Bromobutyl rubber (phr) | 90 | 65 | 65 | 65 | 65 | 65 | 65 |
| Epoxidized natural rubber (phr) | 0 | 25 | 25 | 25 | 25 | 25 | 25 |
| Glass microspheres (phr) | 0 | 5 | 10 | 15 | 5 | 10 | 15 |
| Anchoring agent (phr) | 0 | 0 | 0 | 0 | 0.3 | 0.6 | 0.9 |
| Carbon black (phr) | 55 | 50 | 45 | 40 | 50 | 45 | 40 |
| MDR[1], 170° C. for 30 minutes | | | | | | | |
| T90 (minutes) | 6.8 | 11.5 | 11.7 | 12.1 | 11.7 | 12.6 | 13.2 |
| Maximum torque, dNm | 6.3 | 9.6 | 9.9 | 10 | 10 | 10.3 | 10.6 |
| Minimum torque, dNm | 1.7 | 2 | 1.8 | 1.7 | 1.8 | 1.8 | 1.9 |
| Stress-Strain Properties | | | | | | | |
| 100% ring modulus, MPa | 0.92 | 2.47 | 2.19 | 1.85 | 2.63 | 2.63 | 2.54 |
| 300% ring modulus, MPa | 3.13 | 5.79 | 5.15 | 4.35 | 5.96 | 5.66 | 5.33 |
| Elongation at break (%) | 839 | 439 | 445 | 458 | 432 | 414 | 388 |
| Shore A Hardness | | | | | | | |
| 23° C. | 56 | 77 | 786 | 75 | 77 | 78 | 75 |
| 100° C. | 42 | 52 | 52 | 51 | 53 | 53 | 53 |
| Rebound | | | | | | | |
| 23° C., (%) | 10.3 | 9.2 | 9.2 | 9.0 | 9.4 | 9.2 | 9.1 |
| 100° C. (%) | 43.1 | 48.3 | 48.0 | 47.9 | 48.5 | 49.7 | 49.4 |

TABLE 7-continued

|  | H | I | J | K | L | M | N |
|---|---|---|---|---|---|---|---|
| Rubber Composition Density (g/cc) | | | | | | | |
| Measured | 1.13 | 1.12 | 1.10 | 1.09 | 1.12 | 1.11 | 1.09 |
| Calculated | 1.12 | 1.07 | 1.02 | 0.98 | 1.07 | 1.02 | 0.98 |
| Brittle point, °C.[2] | −33.1 | −24.7 | −22.9 | −24.1 | −25.9 | −24.7 | 21.7 |
| Relative air permeability at 23° C.[3] | 100 | 61 | 68 | 64 | 87 | 71 | 65 |

From Table 7 it can be seen that the introduction of the epoxidized natural rubber (ENR) into the hollow glass microsphere dispersion-containing butyl rubber composition led to significantly improved physical properties as seen by the significantly higher 100 percent and 300 percent modulii and rebound values at both 23° C. and 100° C. even without the anchoring agent for Experimental rubber Samples I through N as compared to rubber Sample H. This is indicative of significantly improved glass microsphere/rubber interaction and, where used, an anchoring effect for the glass microspheres by the anchoring agent (anchoring the glass microspheres to the rubber).

This is considered herein to be significant in a sense that a good glass microsphere filler interaction was obtained with the rubber to therefore stabilize the glass microsphere dispersion within the rubber composition. This is considered herein to lead to significant reduction of an opportunity for the glass microspheres to detach from the polymer, or rubber, under dynamic deformation expected to be occur for a tire innerliner during service of the tire. It is considered that this would promote long term air impermeability performance of the rubber composition.

From Table 7, it can further be seen that the combination of ENR addition and inclusion of the glass microspheres in the rubber Samples resulted in a significant enhancement of the resistance to air permeability, as compared to rubber Sample I without the glass microspheres, especially for more highly loaded rubber Samples J, K, M and N which reported only 65 to 70 percent of the air permeability of rubber Sample H.

This is considered herein to be significant in a sense of promoting an enhanced age resistance of tire carcass components such as, for example, carcass ply rubber coats and the carcass itself by promoting a reduction in air transmission through the tire innerliner layer for tire innerliners of a similar or same thickness, or gauge. It can also be seen that a reduction in the weight of the tire can be obtained because of the lower density of the innerliner rubber composition for innerliners of the same thickness, or gauge. Uniquely, it can further be seen that a reduction in the thickness of the innerliner might be used and still obtain a satisfactory resistance to air transmission to effect a further reduction in tire weight to further increase fuel economy for an associated vehicle.

Accordingly, for Samples I, J and K, it is seen that the epoxidized natural rubber has acted in a manner of an anchoring agent for the hollow glass microspheres in the cured rubber matrix in the absence of the bis(3-trialkylsilylalkyl) polysulfide anchoring agent.

EXAMPLE V

Two high crush strength hollow glass microspheres, namely 10,000 psi (69 MPa) and 18,000 psi (124.2 MPa) were evaluated in combination with epoxidized natural rubber (ENR) and an anchoring agent to further access the overall performance of hollow glass microsphere-containing rubber composition.

The basic formulation is shown in Table 8.

The anchoring agent used for the hollow glass microspheres was comprised of bis(3-triethoxysilylpropyl) polysulfide as Si266™ on a carbon black carrier in a 50/50 weight ratio thereof from the Evonik Degussa company.

Rubber Samples were prepared from the basic formulation of Table 8 in the manner of Example I.

The rubber Samples are identified herein as rubber Samples O through S.

Rubber Sample A is a Control rubber Sample without an inclusion of hollow glass microspheres.

Various physical properties for rubber Samples prepared from the basic formulation of Table 8 are shown in the following Table 9.

TABLE 8

| Non-Productive Mixing Step (to 150° C.) | |
|---|---|
| Butyl rubber | 10 |
| Bromobutyl rubber | 75-90 |
| Carbon black | 40-60 |
| Anchoring agent | 0-1.2 |
| Microspheres (A)[11] | 0-20 |
| Microspheres (B)[12] | 0-20 |
| Epoxidized natural rubber | 0-15 |
| Rubber processing oil | 3.8 |
| Fatty acid[6] | 0.5 |
| Phenol formaldehyde | 2.5 |
| Productive Mixing Step (to 110° C.) | |
| Accelerator(s) | 1.4 |
| Sulfur | 0.5 |
| Zinc oxide | 1 |

[11]Hollow glass microspheres as S60 ™ from the 3M Company having an average diameter of about 30 microns and a crush strength of about 10,000 psi (69 MPa) and a true density of about 0.6 g/cc.
[12]Hollow glass microspheres as S60HS ™ from the 3M Company having an average diameter of about 30 microns and a crush strength of about 18,000 psi (124.2 MPa) and a true density of about 0.6 g/cc.

TABLE 9

| | Control | Experimental Samples | | | | |
|---|---|---|---|---|---|---|
| | | O | P | Q | R | S |
| Butyl rubber (phr) | 10 | 10 | 10 | 10 | 10 |
| Bromobutyl rubber (phr) | 90 | 75 | 75 | 75 | 75 |
| Epoxidized natural rubber (phr) | 0 | 15 | 15 | 15 | 15 |

TABLE 9-continued

|  | Control | Experimental Samples | | | |
|---|---|---|---|---|---|
|  | O | P | Q | R | S |
| Glass microspheres (A = 69 MPa), (phr) | 0 | 10 | 20 | 0 | 0 |
| Glass microspheres (B = 124 MPa), (phr) | 0 | 0 | 0 | 10 | 20 |
| Anchoring agent (phr) | 0 | 0.6 | 1.2 | 0.6 | 1.2 |
| Carbon black (phr) | 60 | 50 | 40 | 50 | 40 |
| MDR[1], 170° C. for 30 minutes | | | | | |
| T90 (minutes) | 5.9 | 10.8 | 11.4 | 9.8 | 10.7 |
| Maximum torque, dNm | 6.3 | 9.4 | 9.6 | 8.7 | 9.2 |
| Minimum torque, dNm | 1.7 | 1.8 | 1.8 | 1.7 | 1.7 |
| Stress-Strain Properties | | | | | |
| 100% ring modulus, MPa | 0.94 | 2.18 | 2.05 | 2.13 | 1.98 |
| 300% ring modulus, MPa | 3.3 | 5.13 | 4.65 | 5.03 | 4.44 |
| Elongation at break (%) | 804 | 490 | 462 | 491 | 479 |
| Shore A Hardness | | | | | |
| 23° C. | 59 | 76 | 76 | 76 | 73 |
| 100° C. | 41 | 51 | 50 | 48 | 47 |
| Rebound | | | | | |
| 23° C., (%) | 11.0 | 11.3 | 10.6 | 10.7 | 10 |
| 100° C. (%) | 43.3 | 46.0 | 46.3 | 48.6 | 49.6 |
| Rubber Composition Density (g/cc) | | | | | |
| Measured | 1.14 | 1.08 | 1.02 | 1.08 | 1.02 |
| Calculated | 1.13 | 1.06 | 1.00 | 1.07 | 1.00 |
| Brittle point, ° C.[2] | −35.5 | −30.7 | −28.9 | −27.7 | −26.5 |
| Relative air permeability at 23° C.[3] | 100 | 69 | 71 | 78 | 76 |

From Table 9 it can be seen that the introduction of the epoxidized natural rubber (ENR) into the hollow glass microsphere dispersion-containing butyl rubber composition led to significantly improved physical properties as seen by the significantly higher 100 percent and 300 percent modulii and rebound values at both 23° C. and 100° C. even without the anchoring agent for Experimental rubber Samples P through S as compared to rubber Sample O. This is indicative of significantly improved glass microsphere/rubber interaction and, where used, an anchoring effect for the glass microspheres by the anchoring agent (anchoring the glass microspheres to the rubber).

This is considered herein to be significant in a sense that a good glass microsphere filler interaction was obtained with the rubber to therefore stabilize the glass microsphere dispersion within the rubber composition. This is considered herein to lead to significant reduction of an opportunity for the glass microspheres to detach from the polymer, or rubber, under dynamic deformation expected to be occur for a tire innerliner during service of the tire. It is considered that this would promote long term air impermeability performance of the rubber composition.

From Table 9, it can further be seen that the combination of ENR addition and inclusion of the glass microspheres in the rubber Samples resulted in a significant enhancement of the resistance to air permeability, as compared to rubber Sample P without the glass microspheres, with rubber Samples P through S reporting only 70 to 80 percent of the air permeability of rubber Sample P.

This is considered herein to be significant in a sense of promoting an enhanced age resistance of tire carcass components such as, for example, carcass ply rubber coats and the carcass itself by promoting a reduction in air transmission through the tire innerliner layer for tire innerliners of a similar or same thickness, or gauge. It can also be seen that a reduction in the weight of the tire can be obtained because of the lower density of the innerliner rubber composition for innerliners of the same thickness, or gauge. Uniquely, it can further be seen that a reduction in the thickness of the innerliner might be used and still obtain a satisfactory resistance to air transmission to effect a further reduction in tire weight to further increase fuel economy for an associated vehicle.

From Table 9 it can additionally be seen that there was essentially no difference between the measured densities of respective rubber Samples and the calculated densities of respective rubber Samples.

This is considered significant in a sense that practically all of the glass microspheres survived the high shear rubber mixing in an internal rubber mixer as well as associated milling and curing operations.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having an integral innerliner wherein said innerliner is a sulfur cured rubber composition comprised of, based on parts by weight per 100 parts by weight rubber (phr), a blend of
    (A) rubber comprised of at least one of butyl rubber and halobutyl rubber, wherein said halobutyl rubber is comprised of at least one of chlorobutyl rubber and bromobutyl rubber,
    (B) about 20 to about 60 phr of rubber reinforcing filler consisting of rubber reinforcing carbon black,
    (C) about 0.5 to about 30 phr of hollow glass microspheres, wherein said hollow glass microspheres have a crush strength in a range of about 34.5 to about 41.4 MPa and have an average diameter in a range of from about 10 to about 50 microns, and
    (D) an anchoring agent for said hollow glass microspheres having a moiety reactive with hydroxyl groups contained on said glass microspheres and another different moiety interactive with butyl and halobutyl rubber, wherein the moiety of said anchoring agent which is reactive with hydroxyl groups contained on said glass microspheres is composed of siloxy groups and the moiety of said anchoring agent interactive with said rubber is a sulfur based moiety which is interactive with carbon-to-carbon bonds of said rubber.

2. The tire of claim 1 wherein said rubber additionally contains up to about 25 phr of added epoxidized natural rubber wherein said epoxidized natural rubber has an epoxy content in a range of from about 10 to about 50 percent thereof.

3. The tire of claim 1 wherein said butyl rubber is a copolymer of isobutylene and a minor amount of a diene comprised of isoprene wherein the isoprene content of the rubber ranges from about 2 to about 6 percent.

4. The tire of claim 1 wherein said rubber is comprised of a halobutyl rubber.

5. The tire of claim 1 wherein said rubber is comprised of at least one of chlorobutyl and bromobutyl rubber.

6. The tire of claim 1 wherein said rubber is comprised of halobutyl rubber, epoxidized rubber and at least one of chlorobutyl rubber and halobutyl rubber.

7. The tire of claim 1 wherein said anchoring agent is comprised of a bis(3-trialkoxysilylalkyl) polysulfide which contains an average of from about 2 to about 4 connecting sulfur atoms in its polysulfidic bridge.

8. The tire of claim 7 wherein said anchoring agent contains an average of from 2 to about 2.6 connecting sulfur atoms in its polysulfidic bridge.

9. The tire of claim 7 wherein said anchoring agent is comprised of a bis(3-triethoxysilylpropyl) polysulfide.

10. The tire of claim 1 wherein said anchoring agent is comprised of an alkoxyorganomercaptosilane.

* * * * *